Aug. 8, 1972　　　　　　　　A. J. VARRATI　　　　　　　3,682,770
TRANSFERRING A HOT TOP LINER INSERT FROM A FORMING ASSEMBLY
　　TO A DRYER BY A TRANSFER TABLE AND A ROLLOVER TABLE
Filed March 12, 1970　　　　　　　　　　　　　　　　6 Sheets-Sheet 1

Inventor
Anthony J. Varrati
By Ronald E. Barry
Attorney

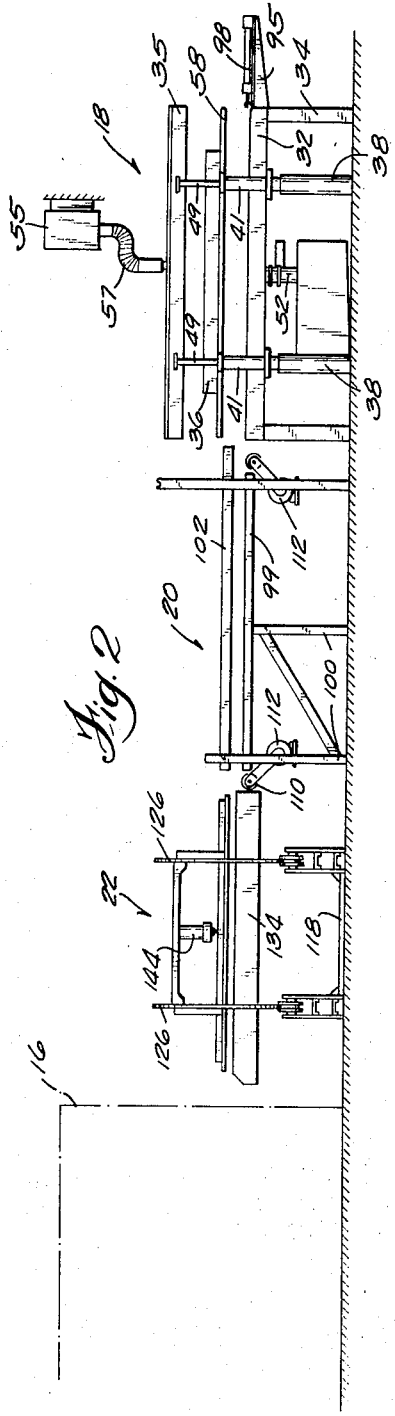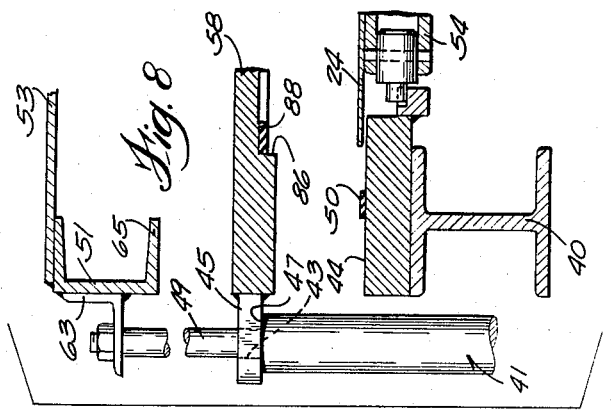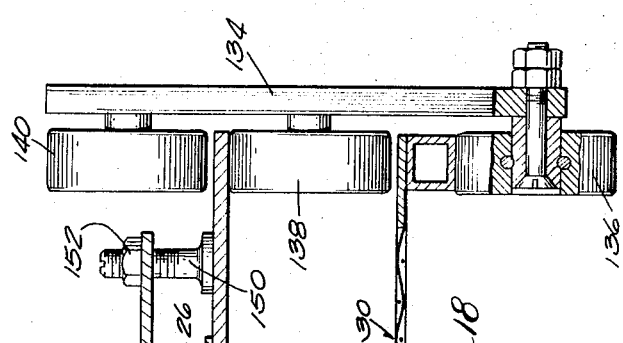

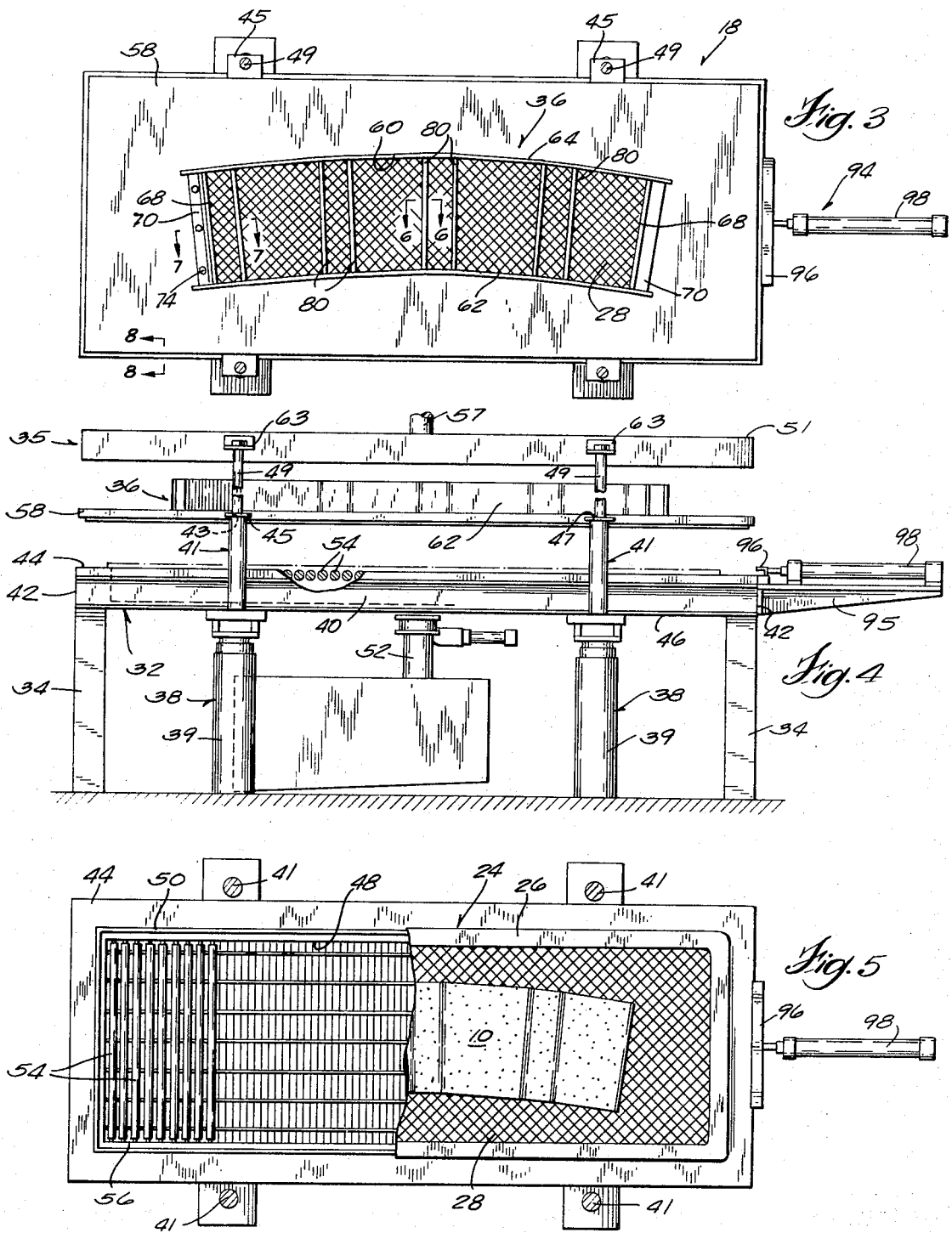

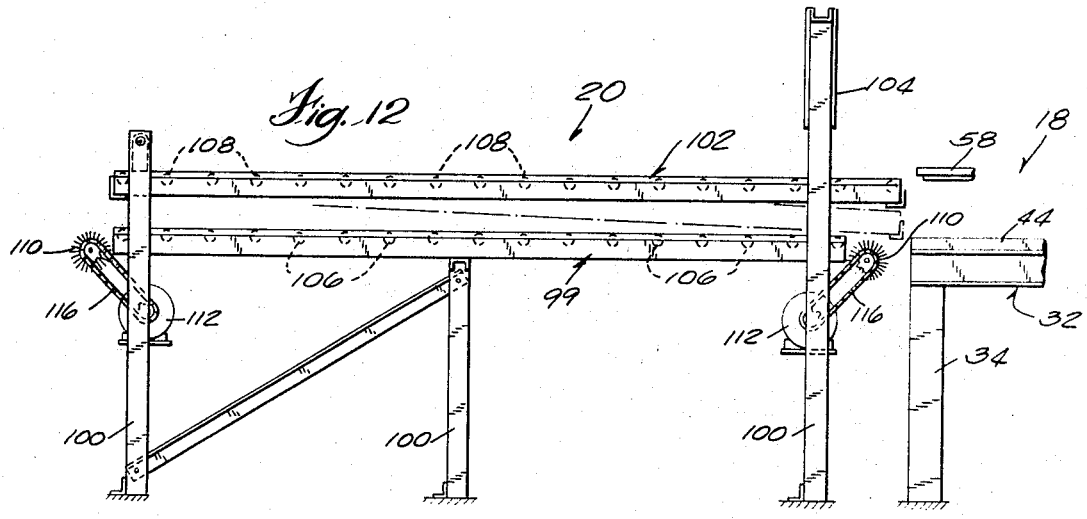
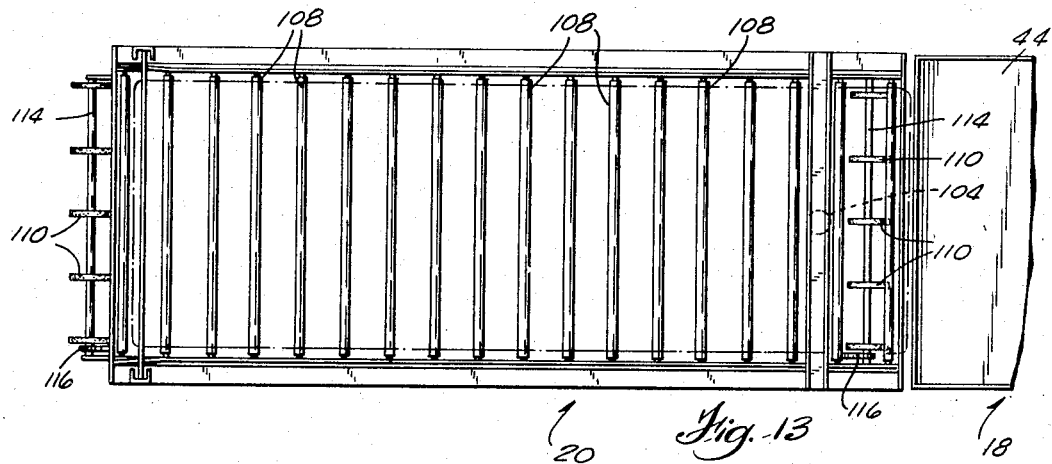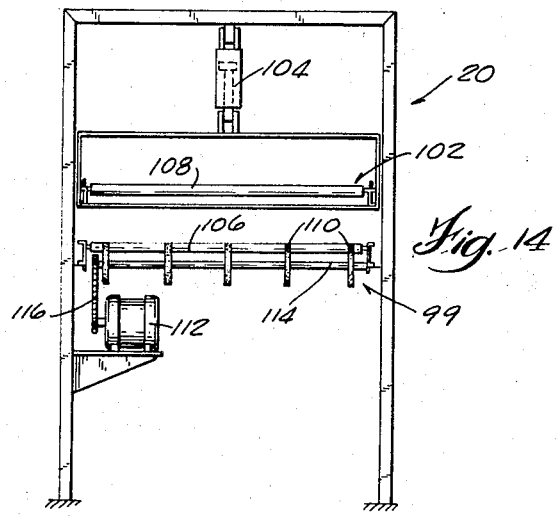

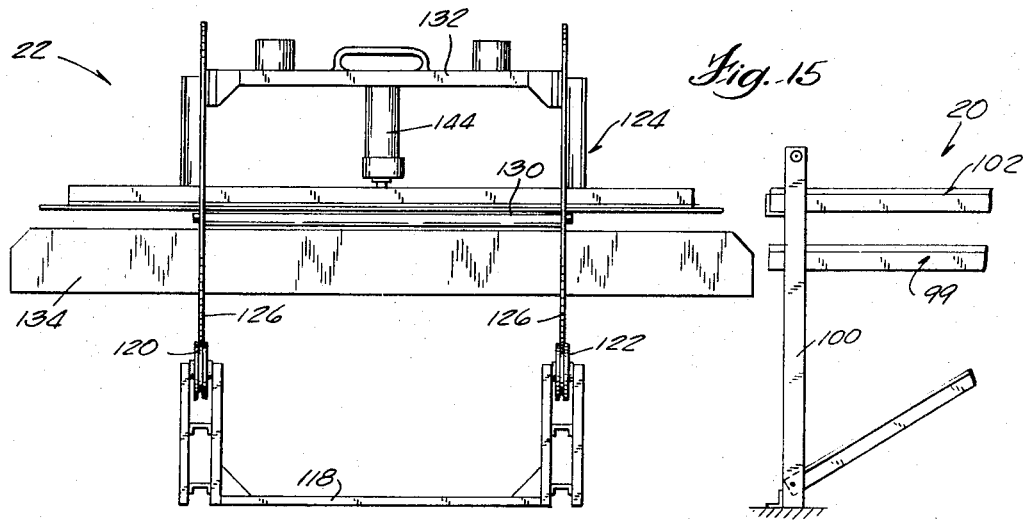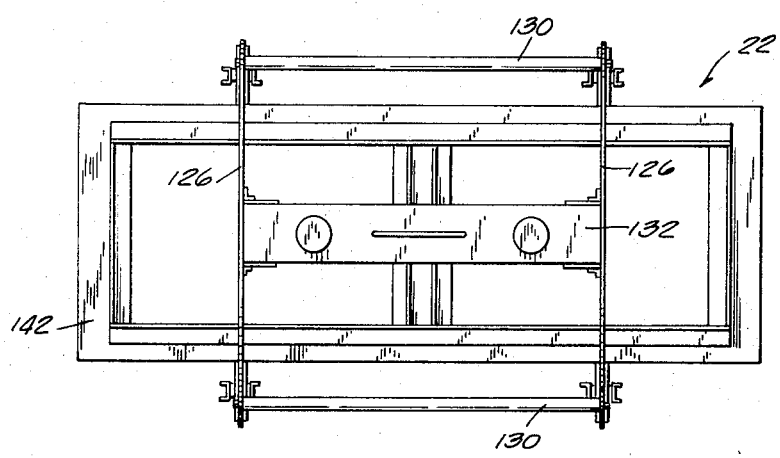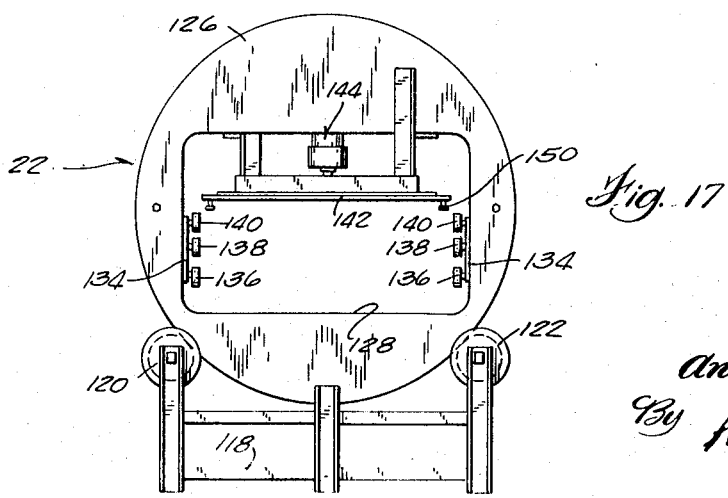

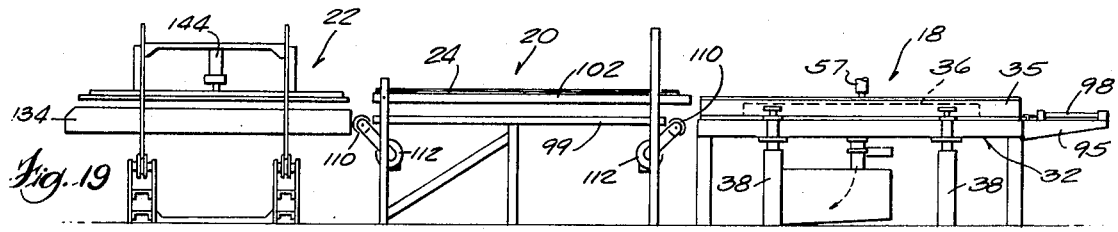
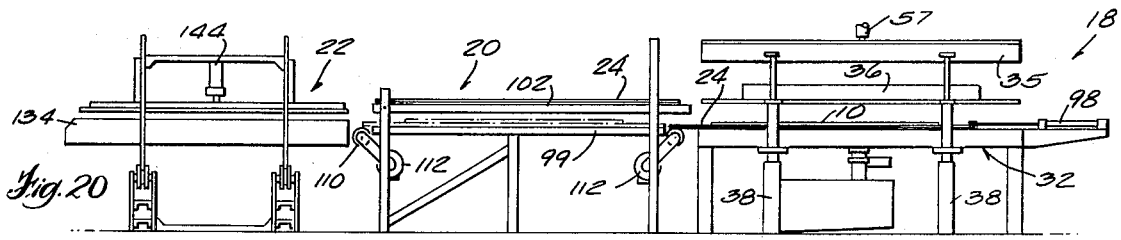
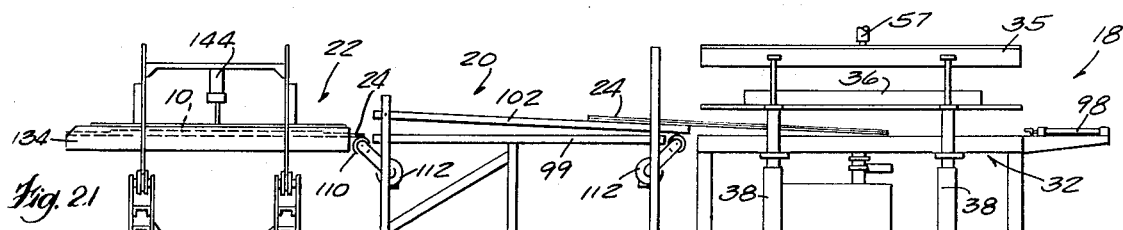
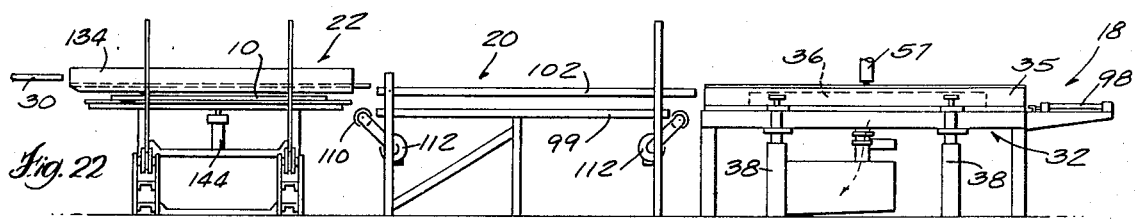
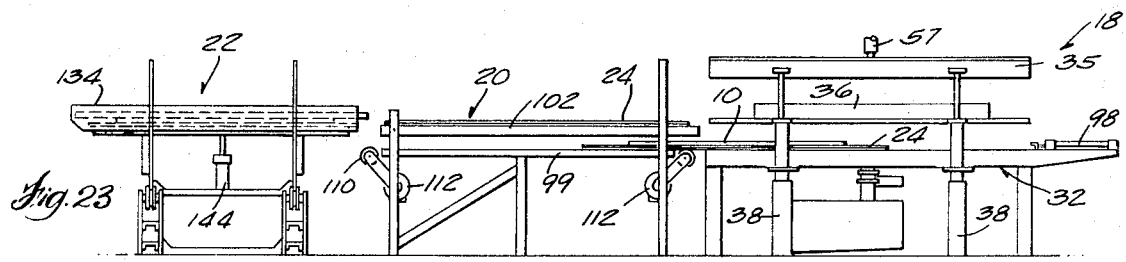
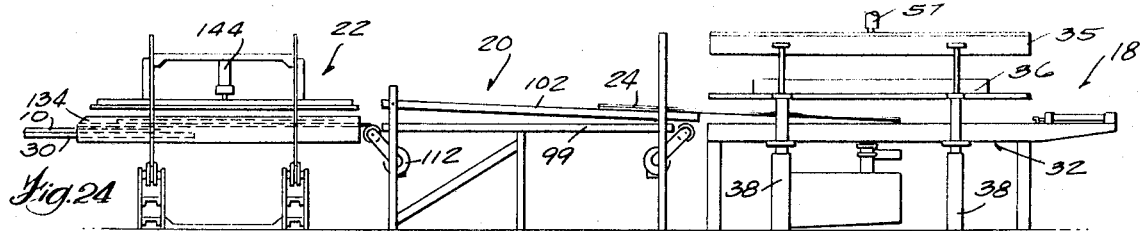

United States Patent Office 3,682,770
Patented Aug. 8, 1972

3,682,770
TRANSFERRING A HOT TOP LINER INSERT FROM A FORMING ASSEMBLY TO A DRYER BY A TRANSFER TABLE AND A ROLLOVER TABLE
Anthony J. Varrati, Milwaukee, Wis., assignor to Universal Refractories Corporation, Milwaukee, Wis.
Filed Mar. 12, 1970, Ser. No. 19,051
Int. Cl. D21j 3/00
U.S. Cl. 162—399
11 Claims

ABSTRACT OF THE DISCLOSURE

The method and apparatus for forming an insert liner unit of the type having a plurality of refractory panels hingedly interconnected by a flexible heat destructible material. The apparatus includes a mold or forming assembly, a transfer table, a roll-over table and a transfer screen on which the unit is formed and which is used to transport the insert unit from the mold assembly through the transfer table to the roll-over table for depositing on a dryer screen. The mold assembly includes a vacuum box on which the transfer screen is supported, a mold which is movable into engagement with the vacuum box to define the contour of the insert unit, and a pressurized air box to force water out of the slurry. The mold is filled with a predetermined amount of refractory slurry which is de-watered through the transfer screen to form a semi-rigid insert unit on the transfer screen. The transfer screen is automatically moved through the transfer table and into the roll-over table where the insert unit is transferred from the transfer screen to the dryer screen.

BACKGROUND OF THE INVENTION

Liner insert units of the type contemplated herein are shown in co-pending application Ser. No. 843,584 filed July 7, 1969 and generally include a plurality of refractory panels formed from a refractory material, an inorganic fibrous material, and a binder with the panels being hingedly interconnected by flexible heat destructible material. The insert unit is adapted for folding to form a hollow truncated unit which can be inserted into a mold or into a hot top to form an insulating surface for the molten metal. These insert units have, for the most part been formed in molds and manually transferred to dryer screen for baking. Difficulties have been encountered in baking an insert unit having a heat destructible hinge material in that the hinge material often is destroyed during the baking operation.

SUMMARY OF THE INVENTION

The method and apparatus of the present invention provides a means for semi-automatically forming a liner insert unit with sufficient insulation of the heat destructible hinge material to alleviate the problem of destroying the hinge material during the baking operation. This is accomplished by molding the insert units on a transfer screen from the slurry of refractory material, inorganic fibrous material, and a heat destructible binder with the flexible hinge material immersed in the slurry. The slurry is automatically de-watered to an extent sufficient to allow the unit to be transported on the transfer screen from the mold to a roll-over stand where the insert unit is automatically placed on a dryer screen. The hinge material between the refractory panels is protected from the heat of the dryer by providing sufficient refractory material in the hinge area to insulate the hinge material from the heat of the dryer. Destruction of the hinge material in the dryer has also been reduced by raising the temperature of the slurry prior to forming the insert unit so that less heat is required to dry the prefromed insert unit in the dryer. The insulating characteristic of the liner is enhanced by forcing air against the slurry and allowing the air to pass through the refractory material.

Other objects and advantages will become apparent from the following detailed description when read in conjunction with the accompanying drawing.

THE DRAWINGS

Figure 1:
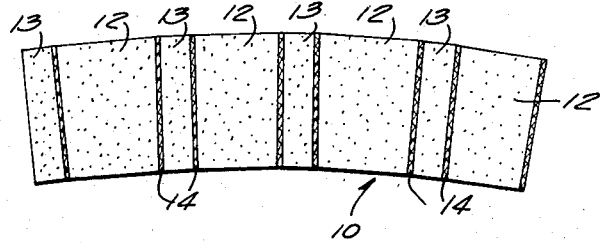
Figure 9:
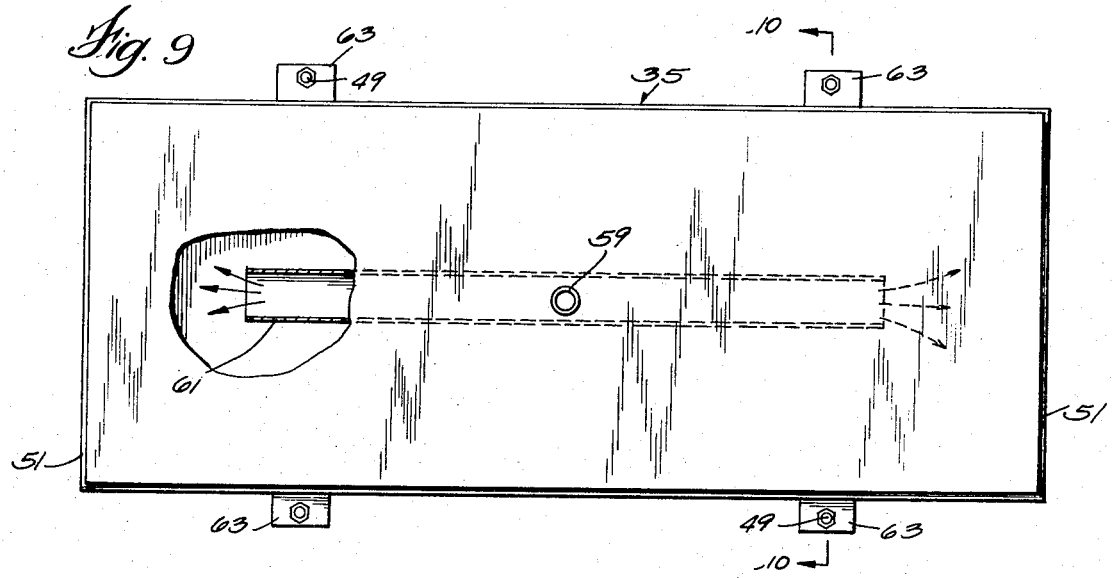
Figure 10:
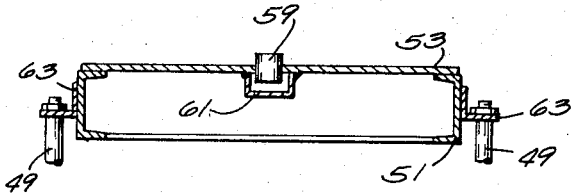
Figure 11:
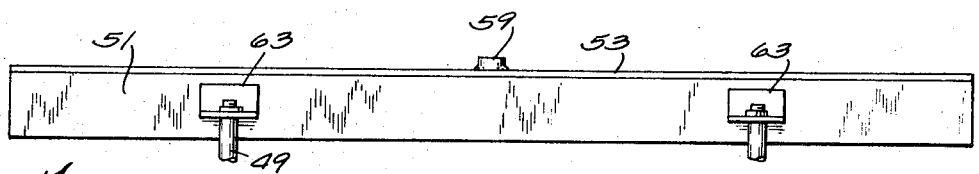

FIG. 1 is a view of a liner insert unit made according to the present invention;
FIG. 2 is a side view of the apparatus for automatically forming the liner insert unit;
FIG. 3 is a top view of the mold assembly;
FIG. 4 is a side view of the mold assembly;
FIG. 5 is a top view of the mold assembly with the mold and air box removed and a portion of the transfer screen broken away;
FIG. 6 is a view taken along line 5—5 of FIG. 2 showing a cross section of one of the cross bars;
FIG. 7 is a view taken along line 6—6 of FIG. 2 showing the adjustable mounting bracket for one of the end walls;
FIG. 8 is an enlarged view of a portion of the mold assembly showing the mold plate separated from the vacuum box, and the air box separated from the mold plate;
FIG. 9 is a top view of the air box;
FIG. 10 is a view taken on line 10—10 of FIG. 9 showing the air box diffuser;
FIG. 11 is a side view of the air box;
FIG. 12 is a side view in elevation showing the transfer table;
FIG. 13 is a top view of the transfer table;
FIG. 14 is an end view of the transfer table;
FIG. 15 is a side view in elevation of the roll-over table;
FIG. 16 is a top view of the roll-over table;
FIG. 17 is an end view of the roll-over table;
FIG. 18 is an enlarged view of a portion of the roll-over table showing the rows of support rollers for the dryer screen and the transfer screen;
FIG. 19 is a view showing the mold assembly closed for the step of dewatering;
FIG. 20 is a view of the apparatus showing the step of moving a transfer screen through the transfer table and into the roll-over table;
FIG. 21 is a view showing the step of moving the second transfer screen into the mold assembly;
FIG. 22 is a view showing the mold assembly closed for the step of dewatering the second insert unit and the step of removing the first insert unit from the transfer screen;
FIG. 23 shows the step of moving the transfer screen to the intermediate position on the top of the transfer table and transferring of the insert unit to the dryer screen; and
FIG. 24 shows the step of returning the insert liner unit to the mold assembly, removing the dryer screen with the first insert unit thereon from the roll-over table and transferring of the second transfer screen with the second liner insert unit thereon into the roll-over table.

DESCRIPTION OF THE INVENTION

The method and apparatus of this invention provides a means for forming a liner insert unit of the type which is used to cover the inside surface of a hot top on the top of a mold and shown in co-pending application Ser. No. 843,584, filed July 7, 1969. The liner insert unit 10 (FIG. 1) generally includes a number of refractory panels 12 and 13 which are hingedly interconnected by a flexible heat destructible hinge material 14 such as nylon mesh, burlap or any other mesh type material having sufficient strength to hold the panels together during shipping and storage. The liner insert unit 10 is initially stored in a flat position and is folded to form a hollow truncated liner which can be inserted into the hot top or ingot mold in a single piece. The refractory panels 12 and 13 are formed from a refractory slurry including a granular refractory material, an inorganic fibrous material and a heat destructible binder as disclosed in the aforementioned application. The flexible hinge material 14 is immersed in the slurry and becomes embedded in the refractory and inorganic fibrous material when the slurry is dewatered. The method and apparatus of the present invention automatically preforms the liner insert unit by removing substantially all of the water from the slurry and transferring the preformed unit to a dryer screen ready for insertion into a dryer 16.

Referring to FIG. 2 of the drawing, the apparatus as shown generally includes a mold assembly 18, a transfer table 20, and a roll-over or turnover table 22. The liner insert unit 10 is preformed by means of the mold assembly 18 and is transferred through the transfer table 20 to the roll-over table 22 by means of a porous screen 24 which includes (FIG. 5) a rectangular frame 26 and a porous screen 28. The liner insert unit 10 is removed from the transfer screen 24 and deposited on a dryer screen 30 by means of the roll-over table 22 and it is then ready for movement into the dryer 16. The transfer screen 24 is returned to the mold assembly 18 through the transfer table 20.

More particularly and referring to FIGS. 3 through 5, the mold assembly 18 includes a vacuum box 32 mounted on a number of legs 34, a mold 36 and a pressurized air box 35. The mold 36 and air box 35 are supported for movement toward and away from the vacuum box 32 by means of a number of hydraulic cylinders 38. The vacuum box 32 includes vertical side walls 40, end walls 42, a top plate 44, and a bottom plate 46. The top plate 44 has a rectangular opening 48 and is provided with a gasket 50 around the opening 48. A number of rollers 54 are journalled for rotation on a flange 56 provided around the inside edge of the opening 48. A vacuum is drawn in the vacuum box 32 by means of a conventional vacuum pump (not shown) which is connected to the bottom plate 46 of the vacuum box 32 by a pipe 52. The transfer screen 24, as seen in FIG. 8, is supported by means of the rollers 54 for movement into and out of the mold assembly 18.

The outer peripheral contour of the refractory panels 12 and 13 is defined by means of the mold 36 which includes a plate 58 having an opening 60 generally in the shape of the outer periphery of the insert unit 10. Vertical side walls or plates 62 and 64 are provided along the longitudinal sides of the opening 60 and are beveled at 66 to provide the bevel contour for the upper and lower edges of the insert unit. End walls or plates 68 are provided at each end of the opening 60 and are beveled at 76 to provide an angular relation for the end plates of the liner in forming the hollow insert unit. In this regard, the end plates 68 are secured to angle irons 70 (FIG. 7) which have elongate openings 72 in one of the legs 73. The angle irons 70 are secured to the plate 58 by means of screws 74. The end plates 68 are adjusted by loosening the screws 74 and moving the angle irons 70 relative to the plate 58 within the limits of the openings 72 and the legs 73.

The size of the refractory panels 12 and 13 are defined by means of a number of cross bars 80 secured to the plates 62 and 64. Referring to FIG. 6, it will be noted that the cross bars 80 are beveled at their upper edges 82 and at their lower edges 84. The upper edge is beveled to allow for the free flow of the refractory slurry around the top of the cross bar when the slurry is dewatered. The lower edge 84 is beveled to provide the angular relation of the adjacent plates for forming the enclosed truncated unit as described in the aforementioned patent application. The lower edge 84 of the cross bar 80 also terminates in a spaced relation to the bottom of the plate 58 to allow sufficient room between the cross bars 80 and the transfer screen 24 for the flexible hinge material 14 which is used to form the hinge connection between the refractory panels 12 and 13. In this regard, the spacing can be varied to accommodate various types of hinge materials which have different diameters, with the primary consideration being the complete embedding of the hinge material within the refractory slurry to provide insulation from the heat of the dryer 16.

Referring to FIG. 8, means are shown for providing space for the transfer screen 24 between the plate 58 and the rollers 54 in the form of a recess 86 provided in the bottom of the plate 58. A gasket 88 can be provided in the recess 86 to engage the outer edge of the transfer screen 24 when the mold is closed.

In this last regard, the mold assembly 18 is closed by means of the hydraulic cylinders 38 which are actuated to drop the mold 36 downward into sealing engagement with the gasket 50 on the plate 44. Each hydraulic cylinder 38 includes a cylinder 39 and a two stage piston 41 which extends upwardly through aperture 43 in bracket 45 provided on the mold plate 58. Each piston 41 is provided with a shoulder 47 which engages the bracket 45 to support the mold 36. If the transfer screen 24 has been properly aligned on the vacuum box 32, the gasket 88 will engage the edge of the screen 24 forming a secondary seal around the transfer screen. The upper portion 49 of the piston 41 is connected to the air box 35 as more fully described below.

Once the mold 36 is closed and the flexible hinge material 14 properly positioned on the transfer screen 24, the mold 36 is filled with the refractory slurry from a holding tank, not shown, which is supported above the mold assembly 18. Means can be provided for dispensing a predetermined amount of the slurry in the form of a hose connected to the holding tank and having an actuator valve or if fully automated, by means of a prefilled container which is positioned to dispense the slurry directly into the mold. If the former system is used, a mark is provided on one of the side walls 62 or 64 to indicate the amount of slurry required to form the semi-rigid refractory insert unit. It should be understood that the slurry composition contains a predetermined amount of solids and knowing the proper relation of the amount of solids to the slurry, the amount of slurry added can be preset and dewatering will leave the required amount of refractory material and inorganic fibrous material in the mold. If the latter system is used, that is, a prefilled container, the container is automatically filled with a predetermined amount of the refractory slurry and is automatically opened to fill the mold as it closes on the transfer screen.

Once the mold 36 has been filled with the refractory slurry, the slurry is dewatered by means of the vacuum pump which is connected to the bottom plate 46 of the vacuum box 32 by a pipe 52. Sufficient vacuum is drawn within the vacuum box 36 to pull the water through the transfer screen 24 into the vacuum box where it is allowed to drain through the pipe 52 into a conventional separating chamber and the water returned to the mixing chamber. The slurry may be heated prior to filling the mold in order to reduce the amount of heat required to remove the remaining moisture from the insert unit as it passes through the dryer 16. The water temperature should be at least 100° F. After the slurry has been dewatered and the semirigid insert unit formed on the transfer screen, the mold assembly is opened by actuating the hydraulic cylinders 38 to raise the mold 36 from the vacuum box 32. The transfer screen 24 can then be moved out of the mold assembly 18.

Means are provided for aiding in the removal of water from the slurry in the form of the air pressure box 35. In this regard and referring to FIGS. 9–11, the air box 35 includes an outer channel member 51 closed at the top by a plate 53. Air is admitted to the air box from a pressure or air pump 55 through a flexible hose 57 connected to a nipple 59 in the plate 53. The air as it enters the air box is diffused by a baffle member 61 which directs the air horizontally toward the channel member 51 and prevents the high pressure air from deforming the slurry in the mold 36. The air box 35 is supported on the upper portion 49 of the piston 41 by means of bracket 63 provided around the channel member 51. The piston 41 is then moved in two steps. First the piston is dropped to close the mold 36 on the vacuum box 32. After the mold has been filled with slurry, the piston is dropped to close the air box 35 on the mold plate 58. A seal is formed around the air box by means of the flange 65 on the bottom of the channel member 51. It has also been found that by forcing the slurry from the mold 36 by means of high pressure air, 15 to 35 pounds per square inch, air bubbles become entrained in the fiber material of the liner. This enhances the insulating properties of the liner.

Means are provided for moving the transfer screen 24 with the semi-rigid refractory insert unit formed thereon from the mold assembly 18 to the roll-over table 22. Such means includes a hydraulically actuated pusher assembly 94 mounted on a bracket 95 provided at one end of the mold assembly 18. The pusher assembly 94 includes a pusher plate 96 which is positioned to engage one end of the transfer screen 24 and a hydraulic piston and cylinder assembly 98. On actuation of the hydraulic cylinder 98, the pusher plate 96 will push the transfer screen 24 into the transfer table 20.

In this regard and referring to FIGS. 12, 13, and 14, the transfer table 20 includes a first or lower conveyor 99 and a second or upper conveyor 102. The lower conveyor 99 is supported on a number of legs 100 and includes a plurality of rollers 106 which form a conveyor for supporting the transfer screen 24 in the movement from the mold assembly 18 to the roll-over table 22. The second or upper conveyor 102 is pivotally connected at one to the legs 100 and supported at the other end by means of a hydraulic piston and cylinder assembly 104 and includes a plurality of rollers 108 which form a conveyor for supporting the transfer screen 24 in the movement of the transfer screen 24 from the roll-over table 22 back to the mold assembly 18.

The transfer screen 24 is moved across the lower conveyor 99 by means of a number of wire wheels 110 provided at each end of the lower conveyor 99 driven by means of motors 112. More particularly, wire wheels 110 are mounted on shafts 114 which are journalled at each end of the lower conveyor 99. Each of the shafts 114 are driven by means of the motors 112 through a chain drive 116. The transfer screen 24 is pushed from the mold assembly 18 by pusher assembly 94 far enough for the wire wheels 110 to engage the screen 28 from the transfer screen 24. The distance between the shafts 114 for the wire wheels 110 at each end of the lower conveyor 99 is less than the length of the transfer screen 24 so that the transfer screen is transferred from one set of wire wheels 110 to the other set in the movement through the transfer table.

The insert unit 10 is removed from the transfer screen 24 onto the dryer screen 30 by means of the roll-over table 22. More particularly, and referring to FIGS. 15, 16, and 17, the roll-over table 22 generally includes a base 118 having a pair of sheaves 120 and 122 axially aligned and journalled for rotation on each side of the base 118 and a turn-over frame 124 supported for rotary motion on the base 118 by means of the sheaves 120 and 122 for movement between a first position and a second position. The turn-over frame 124 includes a pair of circular plates 126 having rectangular openings 128 interconnected by means of cross rods 130 and a support bar 132. A pair of elongate side plates 134 are secured to the inside of the vertical edges of the opening 128 and extend outwardly from each end of the circular plates 126. Each of the side plates 134 is provided with three rows of support wheels or rollers 136, 138 and 140. The dryer screen 30 is supported by means of the bottom row of rollers 136 when the turn-over frame is in the first position. The transfer screen 24 is supported by means of the center row of rollers 138 when the turnover frame is located in the first position. The center row of rollers 138 are located in substantially the same plane as the top of the lower conveyor 99 of the transfer table 20. When the roller frame 124 is turned over to the second position, the dryer screen 24 will be supported by means of the center row of rollers 138 and the transfer screen will be supported by means of the top row of rollers 140.

The insert unit 10 is transferred from the transfer screen 24 to the dryer screen 30 by means of a press plate 142 supported on the support bar 132 by means of a hydraulic piston and cylinder assembly 144. A press plate 142 is moved downward into engagement with the insert unit 10 on the transfer screen 24 prior to turning the rollover frame over. The roll-over frame 124 is then turned over so that the insert unit is supported by or rests on the press plate 142. The transfer screen 24 is removed from the roll-over frame and the hydraulic assembly 144 actuated to move the press plate 142 toward the dryer screen 30 until the insert unit engages the dryer screen 30. The roll-over frame is turned back through 180 degrees and the press plate retracted leaving the insert unit 10 resting on the dryer screen 30.

It should be noted that in the initial or normal position of the roll-over frame 124, the rollers 138 are aligned with the top of the lower conveyor 99. This allows for the movement of the transfer screen 24 directly onto the rollers 138 from the transfer table 20. When the roll-over frame 124 is turned over, the rollers 140 will be aligned with the upper surface of the upper conveyor 102. This allows for the removal of the transfer screen 24 directly onto the upper conveyor 102 leaving the insert unit resting on the press plate 142.

Since the insert unit 10 is still in a semi-rigid state when it is transferred to the press plate, means are provided to prevent the insert unit from being squeezed between the press plate and the dryer screen and the transfer screen in the transfer of the insert unit from the transfer screen to the dryer screen. Such means is in the form of a number of adjustable screws 150 provided at the four corners of the press plate 142. Stop nuts 152 are provided on the bolts 150 to adjust the bolt length to accommodate various sized insert units.

Operation of the apparatus

Referring to FIGS. 19 through 24, a step-by-step showing of the movement of the insert unit through the apparatus is shown. In FIG. 19, the mold assembly is shown closed and the refractory slurry being dewatered by the vacuum pump 52 through vacuum box 32 and air pump 55 through air box 35. The transfer screen 24 is shown on the upper conveyor 102 of the transfer table 20 and roll-over stand 22 is shown in its normal position.

In FIG. 20, the mold assembly 18 is shown open and the transfer screen 24 with the semi-rigid insert unit 10 formed thereon being moved by the plunger assembly 94 out of the mold assembly and onto the lower conveyor 99 of the transfer table 20, the roll-over stand 22 still being in the normal position.

FIG. 21 shows the mold assembly 18 still opened and a transfer screen 24 being moved by gravity from the upper conveyor 102 on the transfer table 20 into the mold assembly. The hydraulic cylinder 104 having been actuated to drop one end of the conveyor 102 to allow the transfer screen to move freely into the mold assembly. The transfer screen with the insert unit 10 formed thereon is in the roll-over table 22 and the hydraulic cylinder 144 has been actuated to bring the press plate 142 into contact with the insert unit.

In FIG. 22, the mold assembly has again been closed and a dewatering process shown for dewatering the slurry in the mold. The upper conveyor in the transfer table has been turned to its normal position and the roll-over frame 124 has been turned through 180° and the hydraulic cylinder 144 retracted to move the press plate 142 clear of the transfer screen with the insert unit 10 resting on the press plate. The transfer screen 24 can then be moved onto the upper conveyor 102.

In FIG. 23, the mold assembly is shown in the position as in FIG. 17 and the transfer screen is shown partially removed onto the lower conveyor 99 in the transfer table. The hydraulic cylinder 144 is again actuated to bring the insert unit 10 into engagement with the dryer screen 30. The first transfer screen now resting on the upper conveyor 102.

In FIG. 24, the first transfer screen 24 is shown being returned to the mold assembly 18. The dryer screen is shown being removed from the turn-over frame 124 with the first insert unit 10 now resting on the dryer screen. A second transfer screen 24 with the second insert unit 10 is shown positioned in the roll-over frame ready for transfer to another dryer screen, and thus a complete cycle has been shown for moving the transfer screen through the apparatus in a complete cycle.

We claim:

1. An apparatus for preforming a hot top liner insert unit comprising:
   a transfer screen,
   a dryer screen,
   means for forming a liner insert unit on said transfer screen,
   a rollover means for transferring the liner insert unit from said transfer screen to the dryer screen,
   and a transfer table including a first conveyor for moving said transfer screen from said forming means to said rollover means and a second conveyor for returning said transfer screen from said rollover means to said forming means.

2. The apparatus according to claim 1 wherein said forming means includes a vacuum box for supporting said transfer screen, a mold, and means for moving said mold toward and away from said vacuum box.

3. The apparatus according to claim 1 wherein said forming means includes a vacuum box for supporting said transfer screen, a mold mounted for movement into engagement with said transfer screen, and an air pressure box mounted for movement into engagement with said mold.

4. The apparatus according to claim 3 wherein said mold includes a plate having an opening, side walls having beveled edges mounted on the sides of the opening and nd walls having beveled edges adjustably mounted on the ends of said opening.

5. The apparatus according to claim 1 wherein said second conveyor is pivotally mounted above said first conveyor,
   and means for driving the transfer screen across the first conveyor to the rollover means.

6. The apparatus according to claim 5 including means for pivoting said second conveyor to allow the transfer screen to move by gravity into said forming means.

7. The apparatus according to claim 1 wherein said rollover means comprises a base, a roll-over frame mounted for rotary motion on said base from a first position to a second position, a first set of rollers for supporting the dryer screen in the first position, a second set of rollers for supporting the transfer screen in the first position and the dryer screen in the second position, and a third set of rollers for supporting said transfer screen in the second position.

8. An apparatus for forming a hot top liner insert unit having a number of heat insulating panels flexibly interconnected by a heat destructable hinge material, said apparatus comprising
   a transfer screen for supporting the hinge material,
   means for forming the unit on said screen with the hinge material embedded in the panels,
   a dryer screen,
   a base,
   a turn-over frame mounted on said base for movement from a first position to a second position,
   a number of rows of support wheels,
   the bottom row of said wheels being positioned to support the dryer screen in the first position, the center row of said wheels being positioned to support said transfer screen in said first position and the dryer screen in said second position,
   said top row of wheels being positioned to support said transfer screen in said second position,
   a transfer table for moving said transfer screen to said center row of wheels,
   and means for pushing said transfer screen from said forming means onto said transfer table.

9. The apparatus according to claim 8 wherein said forming means includes:
   a vacuum box,
   a mold,
   an air pressure box,
   and means for moving said mold into sealing engagement with said vacuum box and said air pressure box into sealing engagement with said mold.

10. The apparatus according to claim 8 wherein said supporting means includes a press plate and a hydraulic piston and cylinder assembly for moving said press plate into engagement with said transfer screen and the dryer screen.

11. The apparatus according to claim 8 wherein said transfer table comprises:
    a first conveyor for supporting said transfer screen and insert unit for movement from said forming means to said center row of wheels,
    means for driving said transfer screen across said first conveyor,
    and a second conveyor for supporting said transfer screen for return movement from said top row of wheels to said forming means.

References Cited

UNITED STATES PATENTS

| | | | |
|---|---|---|---|
| 3,477,493 | 11/1969 | Charman Jr. et al. | 264—87 X |
| 1,907,207 | 5/1933 | Laussucq | 162—225 |
| 1,951,940 | 3/1934 | Manson | 162—224 X |
| 2,699,097 | 1/1955 | Binkley | 162—224 X |
| 3,415,483 | 12/1968 | Charman et al. | 249—201 |
| 3,478,999 | 11/1969 | Charman et al. | 249—201 |

S. LEON BASHORE, Primary Examiner

R. H. TUSHIN, Assistant Examiner

U.S. Cl. X.R.

162—221, 410; 198—33 AD; 249—201; 264—87